Patented Nov. 2, 1926.

1,605,093

UNITED STATES PATENT OFFICE.

MAURICE ERNEST BOUVIER AND EMILE BLANC, OF LYON, FRANCE, ASSIGNORS TO SOCIÉTÉ CHIMIQUE DES USINES DU RHONE, OF PARIS, FRANCE.

PROCESS FOR THE REDUCTION OF ALKYL ESTERS.

No Drawing. Application filed September 18, 1923, Serial No. 663,477, and in France August 7, 1923.

It is known that certain esters having the formula R.COO.R′ are capable of fixing two molecules of hydrogen when in the presence of suitable catalysts, and will split into two alcohols according to the general formula:

$$R.COO.R' + 2H_2 = R.CH_2OH + R'.OH.$$

It is in this manner, for instance, that Christiansen (French Patent No. 498,270: German Patent No. 369,574) has prepared methyl alcohol by the reduction of methyl formate in the presence of a catalyst, according to the formula:

$$H.COO.CH_3 + 2H_2 = 2CH_3OH.$$

Hitherto, however, such a process was not industrially practicable, for known catalysts were not sufficiently active. The result of this inferior activity was not only that it required the use of apparatus of considerable dimensions for carrying out the process on an industrial scale, but a considerable proportion of the product was decomposed into $CO, CO_2, CH_4$, etc., so that the chemical yield was small and, therefore, the cost of the product was too high.

For instance, according to the examples of the German Patent No. 369,574 5 grammes of the catalyst transform, at atmospheric pressure and at a temperature of 183° C., only .468 milligramme of methyl formate in 115 minutes, giving 384 milligrammes of methyl alcohol and 94 milligrammes of carbon monoxide, with a little carbonic acid and methane.

Only a maximum of 0.05 grammes of methyl formate is therefore transformed per hour per gramme of catalyst. The yield, with respect to methyl formate, is, besides, only 77% of the theoretical yield. Bearing in mind that, for the industrial utilization of the process, more than half the methyl alcohol produced must be transformed back again into methyl formate, the yield in synthetic methyl alcohol from formic acid falls to a maximum of 54% of the theoretical yield. Such results are obviously insufficient.

In a second example, the yield with respect to methyl formate is 94% and, with respect to formic acid, about 86%, but it is necessary to operate at a temperature of 194° C. and under a pressure of 31 atmospheres and under these conditions 1 gramme of catalyst permits the transformation of only 1.6 grammes of formate per hour.

Now, the reduction of methyl formate may be obtained in a satisfactory manner, even at ordinary pressure, by using as a catalyst the active catalytic agents obtained by partial reduction of oxides or hydroxides of copper, to which are added mineral compounds having an alkaline reaction. Any suitable copper oxides of hydroxides, obtained by means of any usual or known process, are taken as the starting point and are spread, if it is desired, on any suitable inert support. For instance, one will start from the black copper hydroxide obtained by precipitation by caustic alkalis from boiling solutions of cupric salts, or in any other way. The oxides or hydroxides may or may not be washed until they cease to give an alkaline reaction. If they are washed, before being dried, they must be treated with a suitable dilute solution of alkaline or alkaline-earth bases or alkaline salt thereof (either alone or mixed) or these bases or alkaline salts may be incorporated therein by any other suitable process. This treatment may be applied either to a new catalytic mass which is already prepared, or to such a catalytic mass which has been made use of, and required regenerating. The hydroxides or oxides, whatever may be their origin, with the addition of bases or alkaline salts as indicated above, are subsequently dried, if necessary, by the ordinary known methods. They are then reduced, preferably in the apparatus and at the place itself which they are to occupy finally, care being taken to stop before the reduction is complete. For this purpose, the catayltic mass is heated by any suitable known means, before or during the passage of the stream of hydrogen, but in any case, during this passage, at a temperature above 80° C., which may vary between wide limits, without, however, much exceeding 160° C., for instance to 130° to 140° C. This treatment will be continued until the weight of the catalytic mass remains appreciably constant at the selected temperature. The active catalytic mass is then ready for use.

For a similar quantity of catalyst, used at atmospheric pressure, it is possible to transform in the same time about 100 times more methyl formate than by the process of the above mentioned patent. This permits the use of an apparatus the dimensions of which are proportionately smaller. The temperature at which the reduction is carried out may, moreover, be markedly lower and the chemical yield, from methyl formate, is practically the same as the theoretical yield.

Taking into consideration the methyl alcohol used again for the preparation of methyl formate, the yield of synthetic methyl alcohol from formic acid is about 90% of the theoretical yield.

The following example is intended merely to indicate and illustrate one particular application of the method described above.

Example.

25 grammes of catalyst prepared as hereinbefore described are placed in a tube heated externally at about 160° C. A mixture of hydrogen and methyl formate is made to pass in the tube, at the rate of 132 grammes of methyl formate and 85.1 grammes of hydrogen per hour. 60 grammes of unaltered methyl formate and 72 grammes of methyl alcohol are collected at the outlet by known means. The excess of hydrogen returns to the inlet and is used circuitously again.

It will be understood that the application of the process which constitutes the object of this invention is not limited to the precise procedure given in the above example. For instance, without departing from the present invention, instead of pure hydrogen, a gaseous mixture containing hydrogen, such as water gas, may be used; other temperatures of reactions, preferably between 100° C. and 180° C. may be selected; if desired the reduction may be carried out above or below atmospheric pressure; also the products of the reaction may be separated by any known means, and, after separation of the methyl alcohol generated, the hydrogen and methyl formate may be brought back into the circuit. Any type of apparatus or heating means which appears desirable may, of course, be made use of.

What we claim and desire to secure by Letters Patent is:—

1. A process of reduction of alkyl esters by hydrogen in the presence of a catalyst obtained by partial reduction of oxides and hydroxides of copper, care being taken that no metallic copper is produced, said catalyst containing added mineral compounds having an alkaline reaction.

2. A process of reducing methyl formate by hydrogen in the presence of a catalyst obtained by partial reduction of oxides and hydroxides of copper, care being taken that no metallic copper is produced, said catalyst containing added mineral compounds having an alkaline reaction.

3. A process of reducing methyl formate by hydrogen in the presence of a catalyst obtained by partial reduction of oxides and hydroxides of copper, care being taken that no metallic copper is produced, said catalyst containing added mineral compounds having an alkaline reaction, heating said catalyst in a tube to a temperature between 80° C. and 160° C., and passing a mixture of hydrogen and methyl formate through said tube.

In testimony whereof we have signed our names to this specification.

MAURICE ERNEST BOUVIER.
EMILE BLANC.